United States Patent
Tsuchida et al.

(10) Patent No.: US 10,545,374 B2
(45) Date of Patent: Jan. 28, 2020

(54) LIGHT SOURCE CONTROL APPARATUS, LIGHT SOURCE CONTROL METHOD AND DISPLAY DEVICE

(71) Applicants: Qingdao Hisense Electronics Co., Ltd., Qingdao, Shandong (CN); TOSHIBA VISUAL SOLUTIONS CORPORATION, Misawa-shi (JP)

(72) Inventors: Masaki Tsuchida, Kawasaki Kanagawa (JP); Kazuya Morishita, Kawasaki Kanagawa (JP)

(73) Assignees: QINGDAO HISENSE ELECTRONICS CO., LTD., Qingdao (CN); TOSHIBA VISUAL SOLUTIONS CORPORATION, Misawa-Shi (JP)

( * ) Notice: Subject to any disclaimer, the term of this patent is extended or adjusted under 35 U.S.C. 154(b) by 0 days.

(21) Appl. No.: 16/109,529

(22) Filed: Aug. 22, 2018

(65) Prior Publication Data
US 2019/0258113 A1 Aug. 22, 2019

(30) Foreign Application Priority Data

Feb. 20, 2018 (JP) .................. 2018-027877

(51) Int. Cl.
*G02F 1/1335* (2006.01)
*H05B 33/08* (2006.01)

(52) U.S. Cl.
CPC ... *G02F 1/133603* (2013.01); *H05B 33/0809* (2013.01); *G02F 2001/133612* (2013.01)

(58) Field of Classification Search
CPC ... G02F 1/133603; G02F 2001/133612; H05B 33/0809
USPC ........................................... 315/246
See application file for complete search history.

(56) References Cited

U.S. PATENT DOCUMENTS

| 9,159,272 | B2 | 10/2015 | Murai et al. | |
|---|---|---|---|---|
| 2005/0285547 | A1* | 12/2005 | Piepgras | F21L 4/08 315/294 |
| 2010/0201282 | A1* | 8/2010 | Yu | H05B 33/0848 315/287 |
| 2012/0299979 | A1 | 11/2012 | Murai et al. | |
| 2013/0320848 | A1* | 12/2013 | Miyake | H05B 37/02 315/53 |
| 2016/0358557 | A1 | 12/2016 | Mori | |

FOREIGN PATENT DOCUMENTS

| EP | 2571334 A1 | 3/2013 |
|---|---|---|
| JP | 2002-324685 A | 11/2002 |
| JP | 2010-008769 A | 1/2010 |

(Continued)

*Primary Examiner* — Don P Le
(74) *Attorney, Agent, or Firm* — Hauptman Ham, LLP

(57) ABSTRACT

According to one embodiment, a light source control apparatus controls a light source emitting phosphorescence. The light source control apparatus includes a driver configured to supply a drive pulse to the light source. The driver is configured to generate a first drive pulse comprising constant amplitude and a pulse width based at least in part on the lighting value and a second drive pulse comprising a constant pulse width and amplitude based at least in part on the lighting value. The driver is configured to supply the first drive pulse or the second drive pulse to the light source in accordance with the lighting value.

5 Claims, 8 Drawing Sheets

(56) References Cited

FOREIGN PATENT DOCUMENTS

| JP | 5679937 B2 | 3/2015 |
|---|---|---|
| JP | 2017-003699 A | 1/2017 |
| WO | WO2011/104952 A1 | 9/2011 |

\* cited by examiner

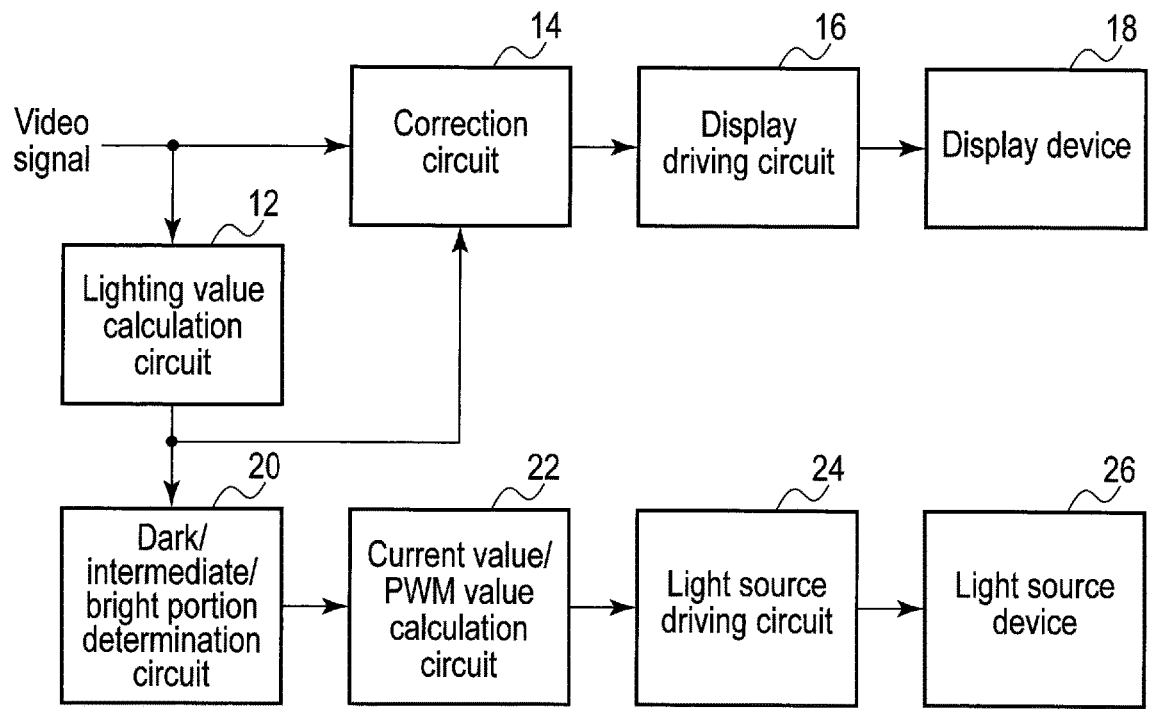
F I G. 1
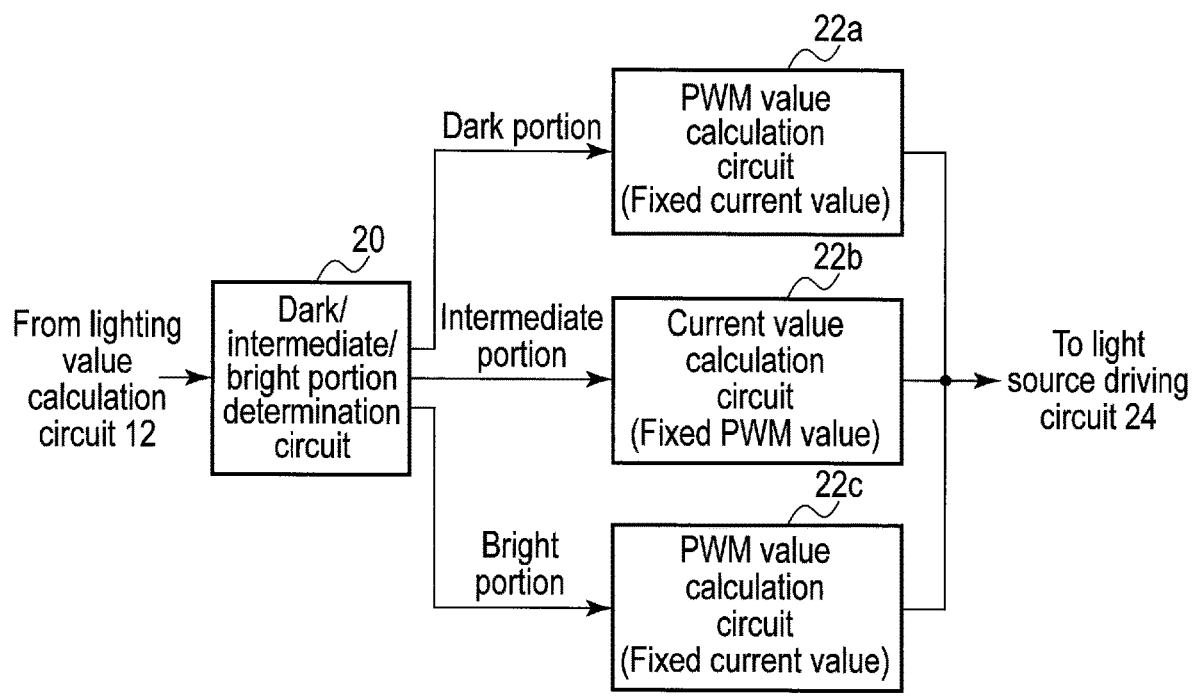
F I G. 2

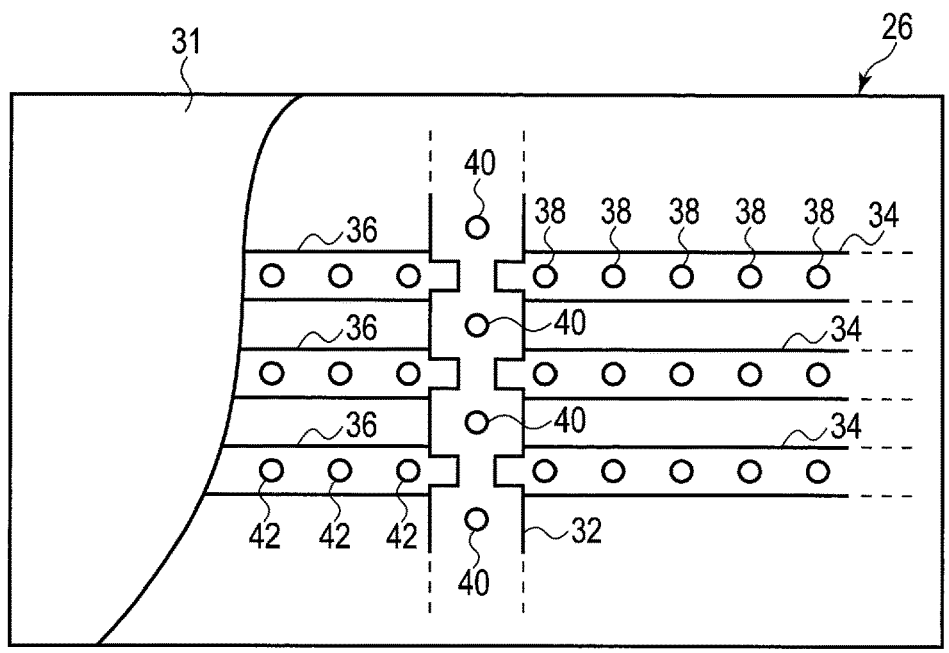
F I G. 4
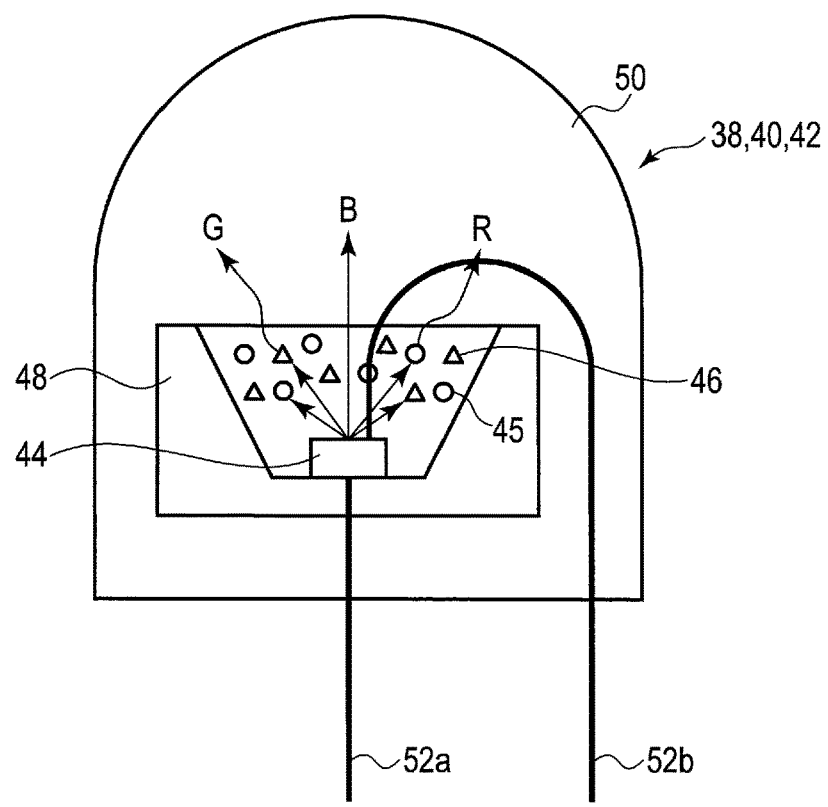
F I G. 5

LIGHT SOURCE CONTROL APPARATUS, LIGHT SOURCE CONTROL METHOD AND DISPLAY DEVICE

CROSS-REFERENCE TO RELATED APPLICATIONS

This application is based upon and claims the benefit of priority from Japanese Patent Application No. 2018-027877, filed Feb. 20, 2018, the entire contents of which are incorporated herein by reference.

FIELD

Embodiments described herein relate generally to a light source control apparatus and a light source control method for a liquid crystal display device, and a display device.

BACKGROUND

Light-emitting diodes (LEDs) may be used for the light sources of liquid crystal display devices. Area control can be applied to LED light sources. Thus, it is possible to display an image with high quality such as high brightness and wide color gamut. In area control, the lighting value of the LED of each lighting area is calculated based at least in part on pixel data corresponding to the lighting area for each frame. A current and a lighting time are controlled based at least in part on the lighting value. As the lighting time is controlled by a pulse width modulation (PWM) of the lighting time, the lighting time control may be also called a PWM control. When a white LED as a backlight is driven by combining the current control and the PWM control of the lighting time, the emission color of the LED can be controlled by the current, and the brightness can be stably controlled by the PWM.

The properties of LEDs are uneven. Thus, the gradation control of the lighting value is unstable by only the current control. The stable change in brightness and improvement of dynamic characteristics are realized by the PWM-controlling the lighting time in a state where a current is kept constant.

It is necessary to considerably reduce the lighting time (pulse width) to decrease the brightness. However, if the pulse width is narrow, the PWM control of the lighting time may be unstable because of the relationship between the pulse width and the timing of supply of a constant current to the LED. Regarding dark portions in which the brightness is difficult to control by the PWM control of the lighting time, a method for stabilizing the gradation of the lighting value by the current control is proposed. In this method, the current control is performed with a fixed pulse width in dark portions. In the other portions (bright portions), the PWM control of the lighting time is performed with a fixed current (the maximum value in the current control).

For the LED light source, LEDs of three colors of red, green and blue are used. Further, a white LED prepared by combining fluorescent elements emitting green light and red light with blue light having a short wavelength as an excitation light source is used. A white LED may use a phosphorescent element which emits phosphorescence as well as fluorescence to realize a wide gamut. Fluorescence disappears at once (in approximately one billionth of a second to one hundred-thousandth of a second).

However, phosphorescence disappears in approximately one thousandth of a second to several seconds. Thus, when an object moves at high speed on a screen, phosphorescence may remain in eyes after the movement of the object. Thus, the image quality may be degraded. When the white LED which emits phosphorescence is driven by performing the current control in dark portions and performing the PWM control of the lighting time in bright portions, an afterglow may occur in accordance with the pulse width of the PWM. When the PWM value (the duty ratio of the pulse width) is 100%, no problem occurs. However, it is known that the degradation of the display quality by the afterglow of phosphorescence is noticeable when the pulse width is decreased to a width.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 shows an example of the configuration of a liquid crystal display device including a light source control apparatus according to an embodiment.

FIG. 2 shows an example of a current value/PWM value calculation circuit 22 of FIG. 1.

FIG. 4 shows an example of a light source device 26 of FIG. 1.

FIG. 5 shows a cross-sectional structure of a white LED.

DETAILED DESCRIPTION

Figure 3A:
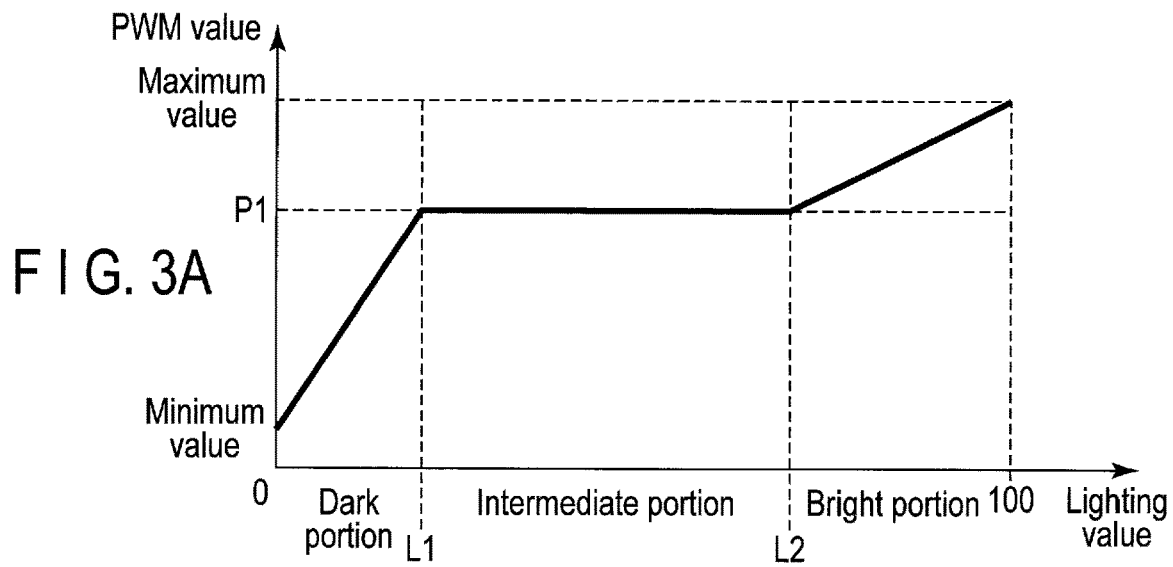
FIGS. 3A, 3B and 3C show an example of operation of the light source driving circuit 24 of FIG. 1.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a light source control apparatus is configured to control a light source emitting phosphorescence. The light source control apparatus includes a driver configured to supply a drive pulse to the light source. The drive pulse is generated based at least in part on a lighting value of the light source. The driver is configured to generate a first drive pulse comprising constant amplitude and a pulse width based at least in part on the lighting value and a second drive pulse comprising a constant pulse width and amplitude based at least in part on the lighting value. The driver is configured to supply the first drive pulse or the second drive pulse to the light source in accordance with the lighting value.

A light source control apparatus is applicable to the control apparatus of various light sources which emit phosphorescence. However, in the following explanation, this specification explains an embodiment applied to the control apparatus of the backlight source of a liquid crystal display device.

FIG. 1 shows an example of the configuration of a liquid crystal display device including a light source control apparatus according to an embodiment. As shown in FIG. 1, a video signal is input to the liquid crystal display device from outside. The video signal may be input from a video camera, a TV tuner, a player of an optical disk which records video, etc., or may be input via the Internet. The video signal is input to a lighting value calculation circuit 12 and a correction circuit 14. The lighting value is a value based at least in part on the lighting intensity of the backlight source. As described later, lighting control of the backlight is based at least in part on each of the areas into which the screen in divided, instead of the whole screen. Thus, the dark portion, the intermediate portion and the bright portion have lighting values based at least in part on the areas. The lighting value calculation circuit 12 calculates the lighting value of each area based at least in part on the video signal. The calculated lighting value is supplied to the correction circuit 14 and a dark/intermediate/bright portion determination circuit 20. The correction circuit 14 corrects the video signal so as to supplement the insufficient brightness of the image in accordance with the lighting value and supplies the corrected video signal to a display driving circuit 16. The display driving circuit 16 drives a display device 18 in accordance with the supplied video signal and causes the display device 18 to display an image. The display device 18 includes a liquid crystal display panel. Each pixel formed by a liquid crystal element is turned on/off in accordance with the video signal.

Based at least in part on the input lighting value, the dark/intermediate/bright portion determination circuit 20 determines to which of the lighting value ranges of the dark portion, intermediate portion and bright portion the lighting value of the area belongs. The result of determination is supplied to a current value/PWM value calculation circuit 22. Based at least in part on the information indicating to which of the lighting value ranges of the dark portion, intermediate portion and bright portion the lighting value of the area belongs, the current value/PWM value calculation circuit 22 obtains the drive current of the backlight relating to the area. Specifically, the current value/PWM value calculation circuit 22 is capable of performing the current control with a fixed PWM value or the PWM control of the lighting time with a fixed current value. The current value/PWM value calculation circuit 22 determines whether the current control or the PWM control of the lighting time should be performed based at least in part on the information indicating to which of the lighting value ranges of the dark portion, intermediate portion and bright portion the lighting value of each area belongs. The current value/PWM value calculation circuit 22 supplies a drive pulse having the current value and PWM value determined by the current control and the PWM control of the lighting time to a light source driving circuit 24. The light source driving circuit 24 supplies a drive current having amplitude based at least in part on the input current value and a pulse width based at least in part on the input PWM value to a light source device 26.

FIG. 2 shows an example of the current value/PWM value calculation circuit 22 of FIG. 1. As shown in FIG. 2, the current value/PWM value calculation circuit 22 includes a PWM value calculation circuit 22a, a current value calculation circuit 22b and a PWM value calculation circuit 22c. For the sake of convenience, three calculation circuits 22a, 22b and 22c are described for different operations. However, the number of calculation circuits may be one if the operation of the calculation circuit varies. Since the PWM value calculation circuits 22a and 22c have the same operation, even when the calculation circuits are described for different operations, a PWM value calculation circuit and a current value calculation circuit are described.

When the result of determination indicates that the lighting value of the area belongs to the dark portion, the lighting value is supplied to the PWM value calculation circuit 22a. The PWM value calculation circuit 22a calculates a PWM value based at least in part on the lighting value in a state where the current value is fixed. When the result of determination indicates that the lighting value of the area belongs to the intermediate portion, the lighting value is supplied to the current value calculation circuit 22b. The current value calculation circuit 22b calculates a current value based at least in part on the lighting value in a state where the PWM value is fixed. When the result of determination indicates that the lighting value of the area belongs to the bright portion, the lighting value is supplied to the PWM value calculation circuit 22c. The PWM value calculation circuit 22c calculates a PWM value based at least in part on the lighting value in a state where the current value is fixed.

Figure 3B:
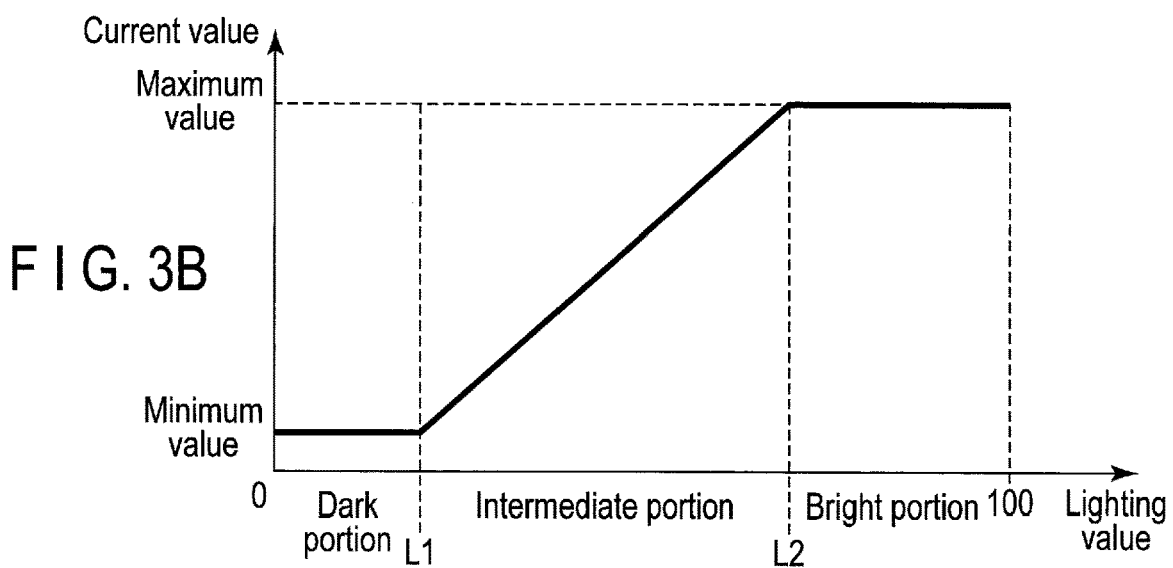
Figure 3C:
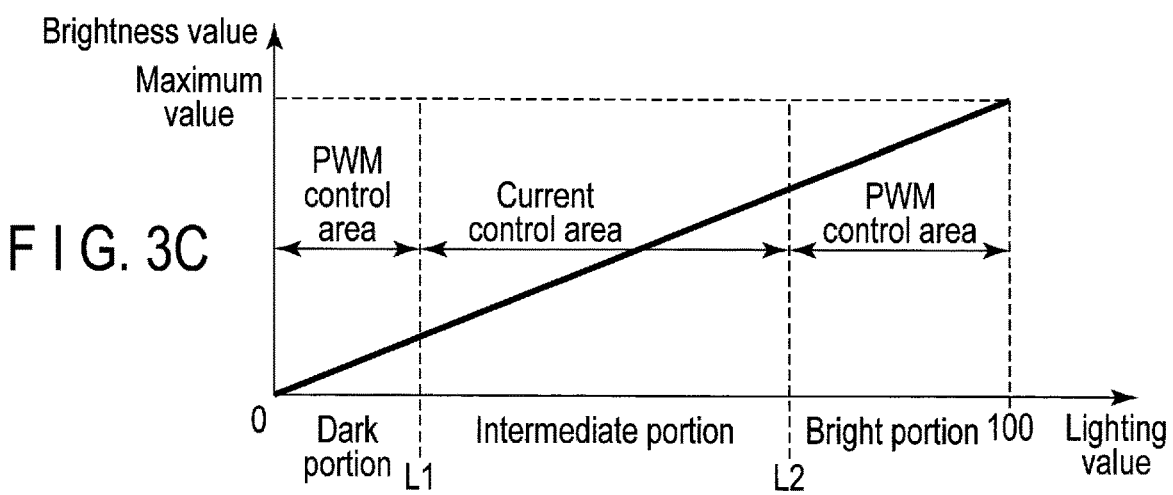

FIGS. 3A, 3B, and 3C show examples of the PWM control of the lighting time and the current control for the dark portion, the intermediate portion and the bright portion in the light source control of the embodiment. FIG. 3A is a graph showing the change in the PWM value for the lighting value calculated from a video signal. FIG. 3B is a graph showing the change in the current value for the lighting value calculated from a video signal. FIG. 3C is a graph showing the change in the brightness value of the liquid crystal display panel of the display device 18 for the calculated lighting value. The brightness value is controlled so as to linearly change for the lighting value.

The dark portion corresponds to an area in which the picture of the image is dark. The bright portion corresponds to an area in which the lighting value is the maximum value like all white. The intermediate portion is the other area. Thus, the intermediate portion is an area in which the change in the lighting value is the largest. The specific definitions of the dark portion, intermediate portion and bright portion are as follows.

As shown in FIG. 3C, it is assumed that the light source device 26 is controlled such that the brightness value of the display device 18 linearly changes for the lighting value. The first threshold L1 of the lighting value for dividing the dark portion from the intermediate portion is a lighting value based at least in part on the PWM value P1 in which the effect of the afterglow of phosphorescence cannot be viewed when the current is the minimum value and the PWM value is increased in accordance with the increase of the lighting value. As described later, when the PWM value is 100%, the effect of the afterglow of phosphorescence is not viewed. When the PWM value is decreased, the effect of the afterglow is viewed. As a result of experiment, it was found that the effect of the afterglow of phosphorescence was not viewed when the PWM value was greater than or equal to 70% in the PWM control of the lighting time in a state where the current was fixed to the minimum value. Thus, the first threshold L1 is a lighting value in which the PWM value is P1 (for example, 70%) in the PWM control of the lighting time in a state where the current is the minimum value.

The second threshold L2 of the lighting value for dividing the intermediate portion from the bright portion is the maximum value which could be set by the lighting value calculation circuit 12 in consideration of power, etc., when a video signal of all white is input to the liquid crystal display device. For example, the current value of the drive current for a video signal of all white is the maximum value, and the PWM value is 100%. However, a problem of heat generation occurs. Thus, the LED cannot be driven for a long time with this drive current. Although the current value of the drive current for a video signal of all white is the maximum value, the PWM value corresponding to the second threshold L2 is set to approximately 70%. In other words, a lighting value in which the current value is the maximum value when current control is performed in a state where the PWM value is fixed to approximately 70% is the second threshold L2. In this way, the current control is performed in the intermediate portion in which the change in the lighting value is the largest by area control, and the PWM control of the lighting time is performed in the dark portion and the bright portion. Since the lighting value when a video signal of all white is input to the liquid crystal display device is L2, the lighting value of the bright portion is used for a boost function. In area control, some areas are not lighted up. In this way, the brightness value can be further increased in terms of power in comparison with a case where all the areas are lighted up. This configuration is called a boost function.

The PWM value calculation circuit 22a calculates a PNM which changes from the minimum value to P1 in accordance with the change of the lighting value from 0 to L1 as shown in FIG. 3A in a state where the current value is fixed to the minimum value as shown in FIG. 3B. The current value calculation circuit 22b calculates a current value which changes from the minimum value to the maximum value in accordance with the change of the lighting value from L1 to L2 as shown in FIG. 3B in a state where the PWM value is fixed to P1 as shown in FIG. 3A. The PWM value calculation circuit 22c calculates a PWM value which changes from P1 to the maximum value in accordance with the change of the lighting value from L2 to 100 as shown in FIG. 3A in a state where the current value is fixed to the maximum value as shown in FIG. 3B.

The current value and the PWM value calculated in the current value/PWM value calculation circuit 22 are supplied to the light source driving circuit 24. The light source driving circuit 24 supplies a drive current having amplitude based at least in part on the input current value and a pulse width based at least in part on the PWM value to the light source device 26.

FIG. 4 shows an example of the light source device 26. The light source device 26 is used as the backlight source of a liquid crystal display panel 31 included in the display device 18. The backlight source (light source device 26) is provided immediately under the liquid crystal display panel 31. The backlight source includes a relay substrate 32 provided in a direction (parallel to short sides) orthogonal to the longitudinal direction of the liquid crystal panel 31 around the center of the longitudinal direction, and a plurality of LED bars 34 and 36 provided on the both sides of the relay substrate 32 in the longitudinal direction. Plural LEDs 40 are provided at regular intervals in the relay substrate 32. Plural LEDs 38 are provided at regular intervals in each LED bar 34. Plural LEDs 42 are provided at regular intervals in each LED bar 36. The LEDs 38, 40 and 42 are provided for each of the areas into which the screen of the liquid crystal panel 31 is divided. Each of the LEDs 38, 40 and 42 may be formed of a plurality of LEDs. The LED bars 34 and 36 are electrically connected to the relay substrate 32. The relay substrate 32 is electrically connected to the light source driving circuit 24 of FIG. 1. Each of the LEDs 38, 40 and 42 is driven by the drive current supplied from the light source driving circuit 24 and emits light.

FIG. 5 shows a cross-sectional structure of each of the LEDs 38, 40 and 42. For example, each of the LEDs 38, 40 and 42 is formed of a white LED shown in FIG. 5. The white LED includes a blue LED 44, a red phosphorescent element 45 and a green fluorescent element 46. Lines 52a and 52b are connected to the electrode of the blue LED 44. The blue LED 44, the red phosphorescent element 45 and the green fluorescent element 46 are accommodated in a retention unit 48. The retention unit 48 is packaged by a transparent resin 50 into a bullet shape.

The excitation light of the blue LED 44 having a short wavelength collides with the red phosphorescent element 45 and the green fluorescent element 46. Thus, red fluorescence and red phosphorescence are emitted from the red phosphorescent element 45. Green fluorescence is emitted from the green fluorescent element 46. The red fluorescence, phosphorescence and green fluorescence are mixed with the blue excitation light. Ultimately, white light is emitted to outside.

Figure 6A:
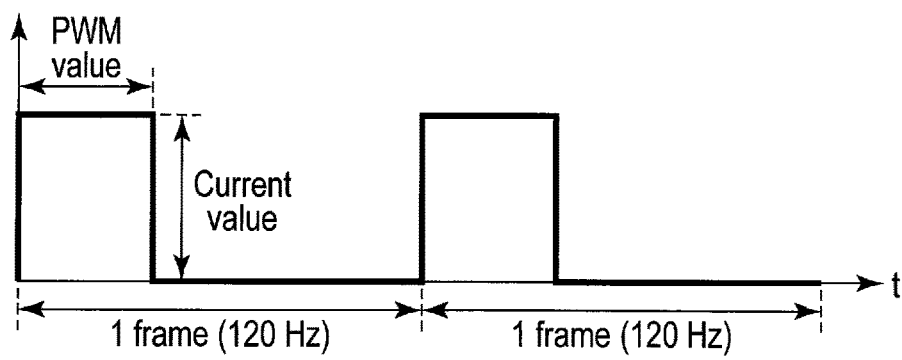
FIGS. 6A, 6B, 6C and 6D show an example of a relation between a driving signal and a light intensity according to the first comparison example.
Figure 6B:
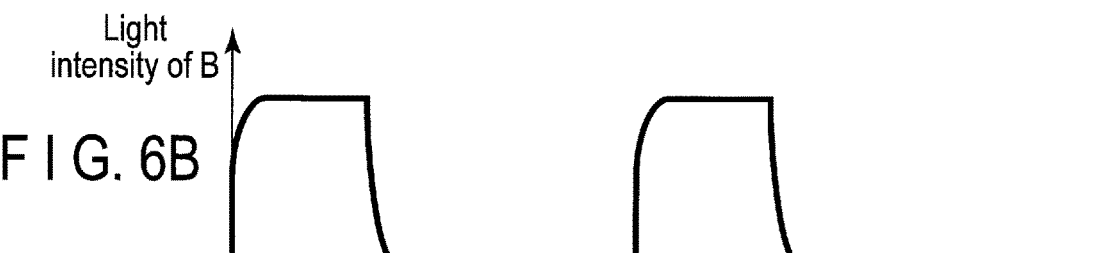
Figure 6C:
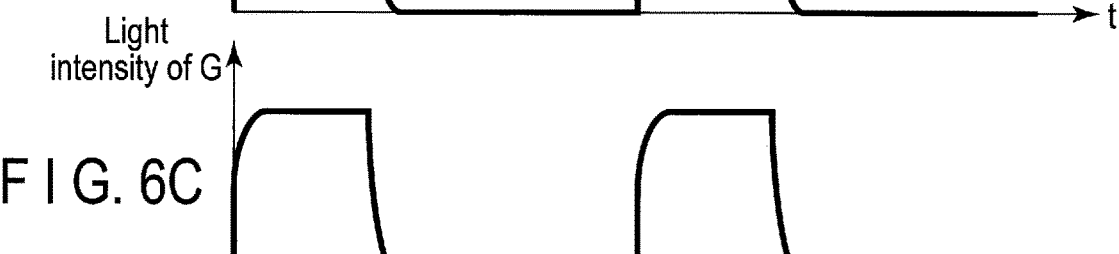
Figure 6D:
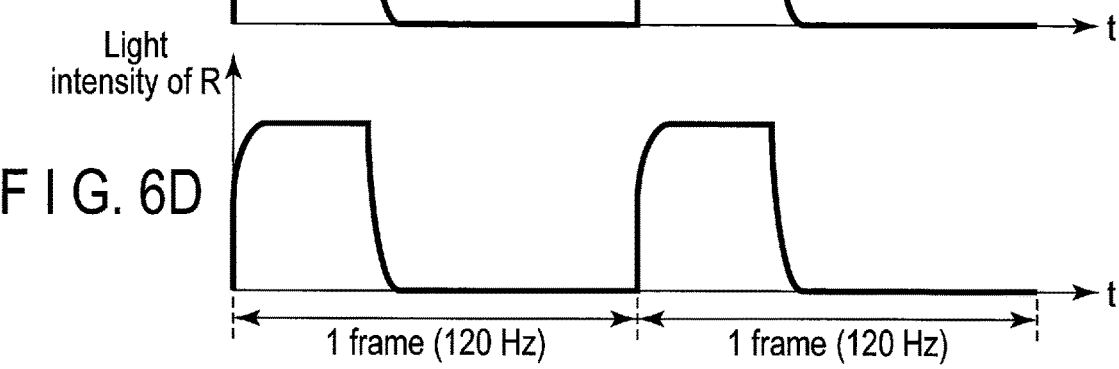

An afterglow of phosphorescence is explained. For a comparison with the embodiment, this specification explains the change of a display screen of the liquid crystal display device of the first comparison example in which a white LED including a blue LED, a red fluorescent element and a green fluorescent element and emitting fluorescence is used as the backlight source. It is assumed that an object moves at high speed on the display screen. FIGS. 6A, 6B, 6C, and 6D show how the white LED is driven by controlling the current value and the PWM value. Here, it is assumed that drive control is performed by determining the current value and the PWM value based at least in part on the lighting value regardless of the portion to which the lighting value belongs, specifically, regardless of the dark, the intermediate or the bright portion. FIG. 6A shows the waveform of the drive current of the white LED. The drive current having amplitude based at least in part on the lighting value and a pulse width based at least in part on the lighting value is supplied to the white LED for each frame (120 Hz) of a video signal. Thus, as shown in FIG. 6B, FIG. 6C and FIG. 6D, the light intensity of blue (B) excitation light, green (G) fluorescence and red (R) fluorescence changes in accordance with the drive current. The white backlight is turned on in a pulse manner. As shown in FIG. 6B, as the blue light is excited in response to the drive current, the change of the intensity of blue light is the same as that of the drive current. As the transient response of fluorescence is short, fluorescence is emitted and disappears following the drive current. The intensity of green light and the red light immediately changes in accordance with the drive current as shown in FIGS. 6C and 6D.

Figure 7A:
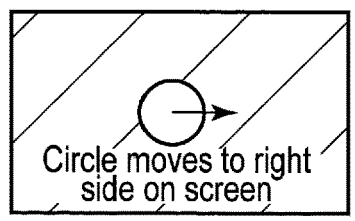
FIGS. 7A and 7B show an example of a hold blur according to the first comparison example.
Figure 7B:
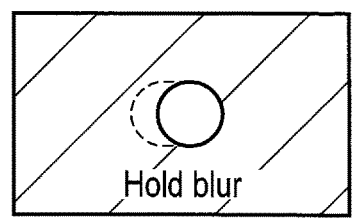

For this reason, when a white circular object is present in a black background as shown in FIG. 7A, and the object moves to the right side on the screen, hold blur unique to liquid crystals may occur as shown in FIG. 7B. The degree of hold blur is based at least in part on the pulse width of drive current. When the PWM value is less, the degree of hold blur is less. When the PWM value is great, the degree of hold blur is great.

Figure 8A:
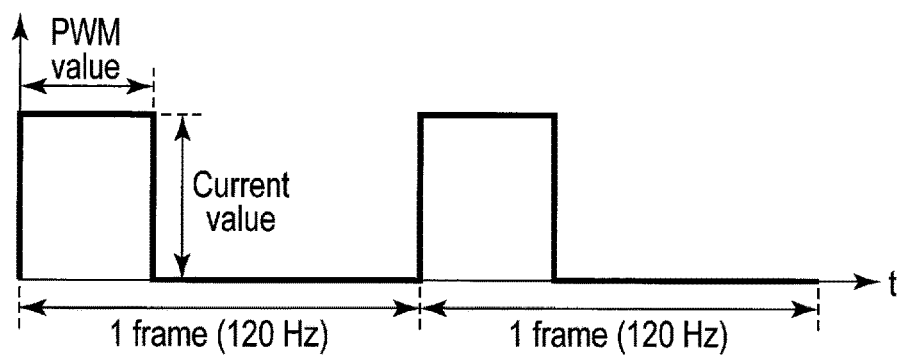
FIGS. 8A, 8B, 8C and 8D show an example of a relation between a driving signal and a light intensity according to the second comparison example.
Figure 8B:
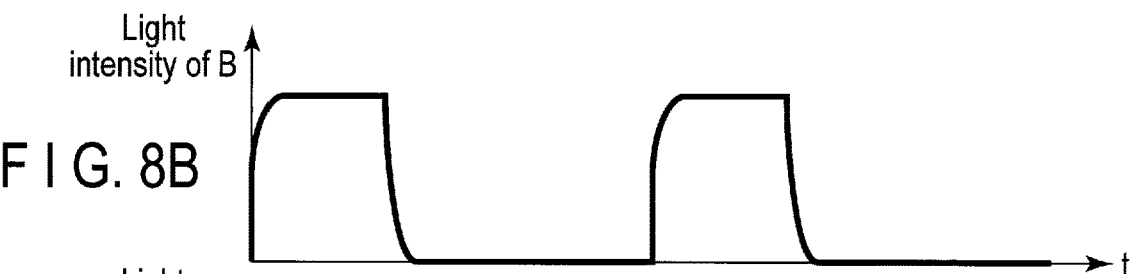
Figure 8C:
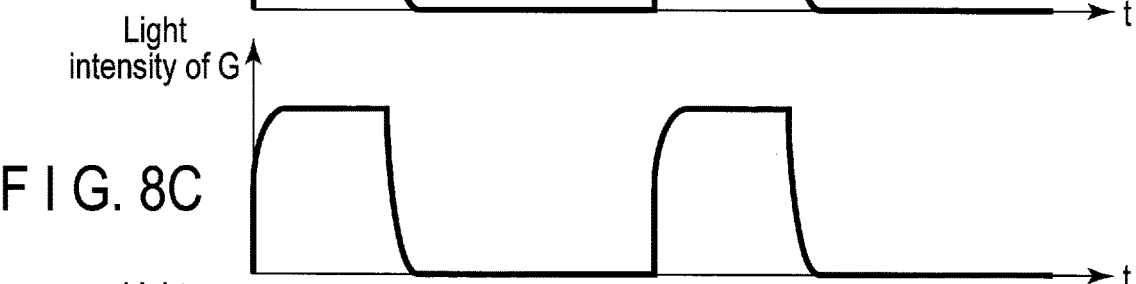
Figure 8D:
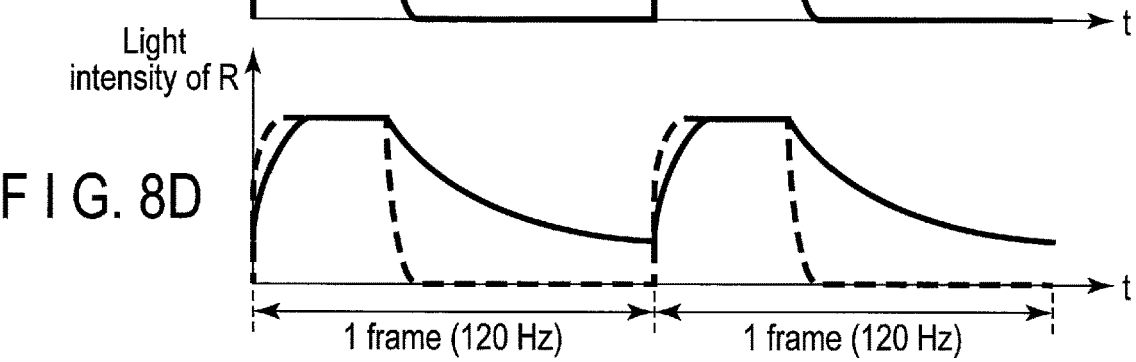

This specification explains the change of a display screen of the liquid crystal display device of the second comparison example in which a white LED including a blue LED, a red phosphorescent element having a long transient response and a green fluorescent element is used as the backlight source in order to, for example, broaden the gamut of the display device 18. It is also assumed that an object moves at high speed on the display screen. FIGS. 8A, 8B, 8C, and 8D show how the white LED is driven by controlling the current value and the PWM value. Here, it is also assumed that drive control is performed by determining the current value and the PWM value based at least in part on the lighting value regardless of the portion to which the lighting value belongs, specifically, regardless of the dark, the intermediate or the bright portion. FIG. 8A shows the waveform of the drive current of the white LED. The drive current having amplitude based at least in part on the lighting value and a pulse width based at least in part on the lighting value is supplied to the white LED for each frame (120 Hz) of a video signal. Thus, as shown in FIG. 8B, FIG. 8C and FIG. 8D, the light intensity of blue excitation light, green fluorescence and red phosphorescence changes in accordance with the drive current. The white backlight is turned on in a pulse manner. As shown in FIG. 8B, as the blue light is excited in response to the drive current, the change of the intensity of blue light is the same as that of the drive current. As the transient response of fluorescence is short, fluorescence is emitted and disappears following the drive current. The intensity of green light immediately changes in accordance with the drive current as shown in FIG. 8C. However, since transient response time of phosphorescence is longer than that of fluorescence, as shown by the solid line of FIG. 8D, red phosphorescence may be emitted even in the next frame. Broken lines shown in FIG. 8D indicate the change of the intensity of red fluorescence shown in FIG. 6D. Red phosphorescence and red fluorescence are emitted in accordance with the drive current. The emission timing of phosphorescence is slightly delayed with respect to the driving current thought the emission timing of fluorescence is not delayed.

Figure 9A:
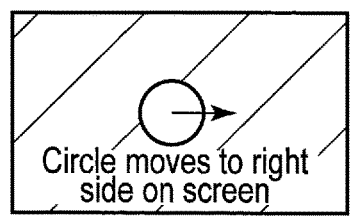
FIGS. 9A and 9B show an example of an afterglow according to the second comparison example.
Figure 9B:
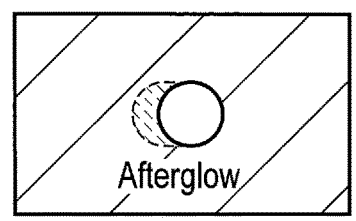

For this reason, when a white circular object is present in a black background and the object moves to the right side on the screen as shown in FIG. 9A, other than the hold blur unique to liquid crystals, red phosphorescence remains in eyes as an afterglow after the movement of the object, as shown in FIG. 9B, and thus, the display quality is degraded. When the PWM value is 100%, no afterglow occurs. When the PWM value is decreased to a certain value, an afterglow is recognized.

Now, this specification explains the relationship between a method for driving the LED and an afterglow.

Figure 10A:
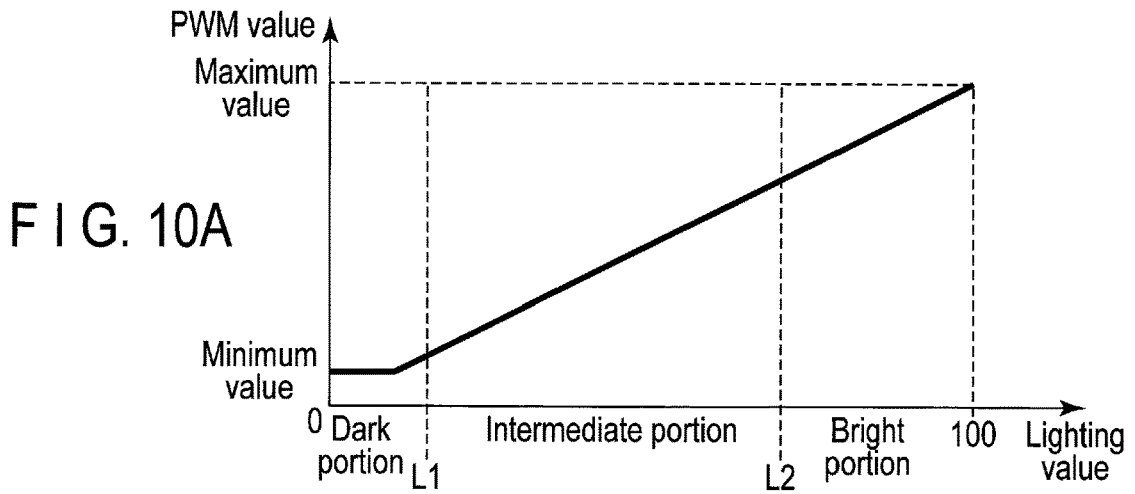
FIGS. 10A, 10B and 10C show an example of operation of the light source driving circuit 24 according to the third comparison example.
Figure 10B:
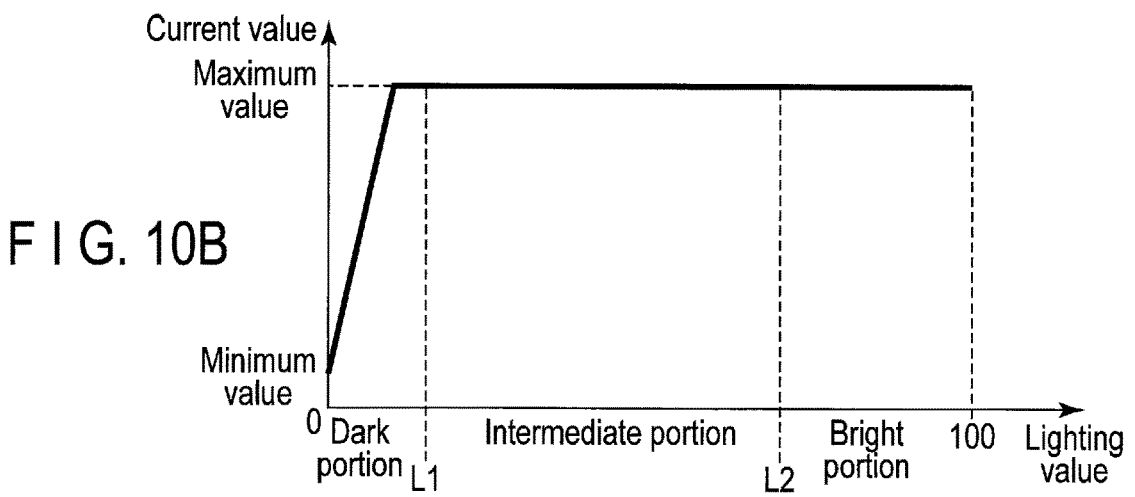
Figure 10C:
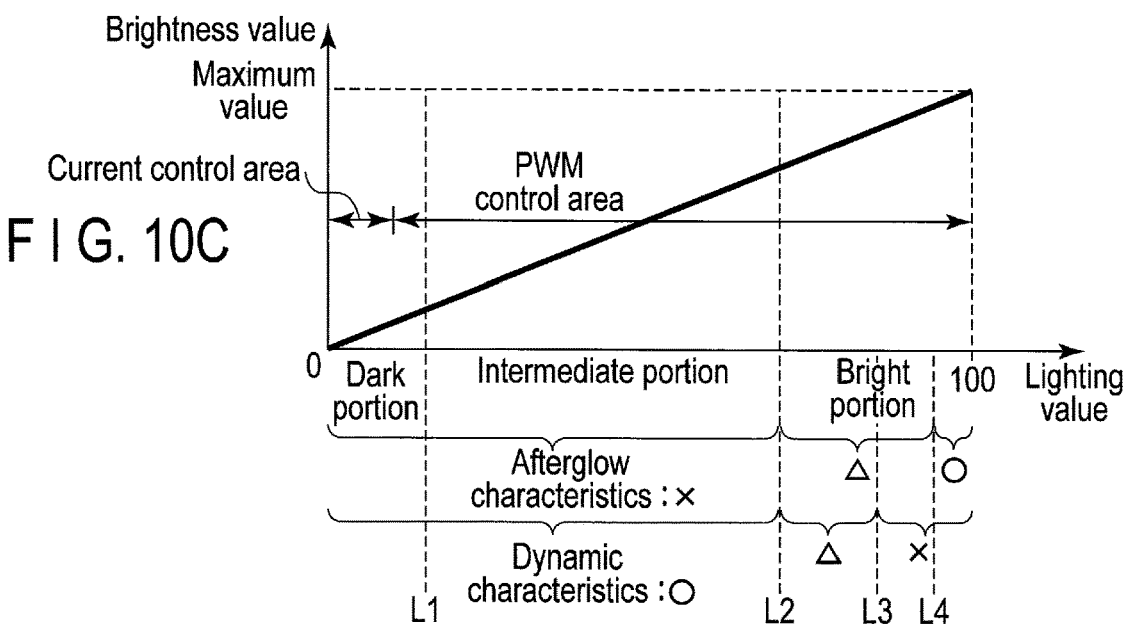

This specification explains the third comparison example with reference to FIGS. 10A, 10B, and 10C. In the third comparison example, the current control is performed in a state where the PWM value is fixed to the minimum value when the lighting value is less than a certain value, and the PWM control of the lighting time is performed in a state where the current value is fixed to the maximum value when the lighting value is greater than or equal to the certain value. FIG. 10A is a graph showing the change in the PWM value for the lighting value calculated from a video signal. FIG. 10B is a graph showing the change in the current value for the lighting value. FIG. 10C is a graph showing the change in the brightness value of the liquid crystal display panel of the display device 18 for the lighting value. The brightness value is controlled so as to linearly change for the lighting value. The definitions of the dark portion, intermediate portion and bright portion are the same as those explained with reference to FIGS. 3A, 3B, and 3C.

Regarding an area in which the lighting value is less than a certain value (less than the first threshold L1), the current control is performed such that the current value changes from the minimum value to the maximum value in accordance with the lighting value as shown in FIG. 10B in a state where the PWM value is fixed to the minimum value as shown in FIG. 10A. Regarding an area in which the lighting value is greater than or equal to the certain value, the PWM control of the lighting time is performed such that the PWM value changes from the minimum value to the maximum value in accordance with the lighting value as shown in FIG. 10A in a state where the current value is fixed to the maximum value as shown in FIG. 10B. In this manner, the brightness value of the display device 18 linearly changes for the lighting value as shown in FIG. 10C.

In this drive control of LED according to the third comparison example, the PWM value is less in the areas of the dark portion and the intermediate portion. Thus, although hold blur is less, and the dynamic characteristics are good, the effect of an afterglow of red phosphorescence is noticeable. The PWM value increases with increasing lighting value. Thus, an afterglow of red phosphorescence is less noticeable as the lighting value is increased. When the lighting value is less than or equal to L2, the effect of an afterglow of red phosphorescence is noticeable. However, when the lighting value exceeds L2, an afterglow of red phosphorescence is less noticeable. When the lighting value exceeds L4, an afterglow of red phosphorescence is hardly recognized. Hold blur increases with increasing PWM value. Thus, the dynamic characteristics are degraded as the PWM value increases. When the lighting value is less than or equal to L2, the dynamic characteristics are good. However, when the lighting value exceeds L2, the dynamic characteristics are degraded. When the lighting value exceeds L3, the dynamic characteristics are significantly degraded. When the LED is driven as shown in FIG. 10A and FIG. 10B, in an area belonging to the intermediate portion in which the change of the lighting value is the largest, the display quality is degraded as an afterglow of red phosphorescence is noticeable while the dynamic characteristics are good.

Figure 11A:
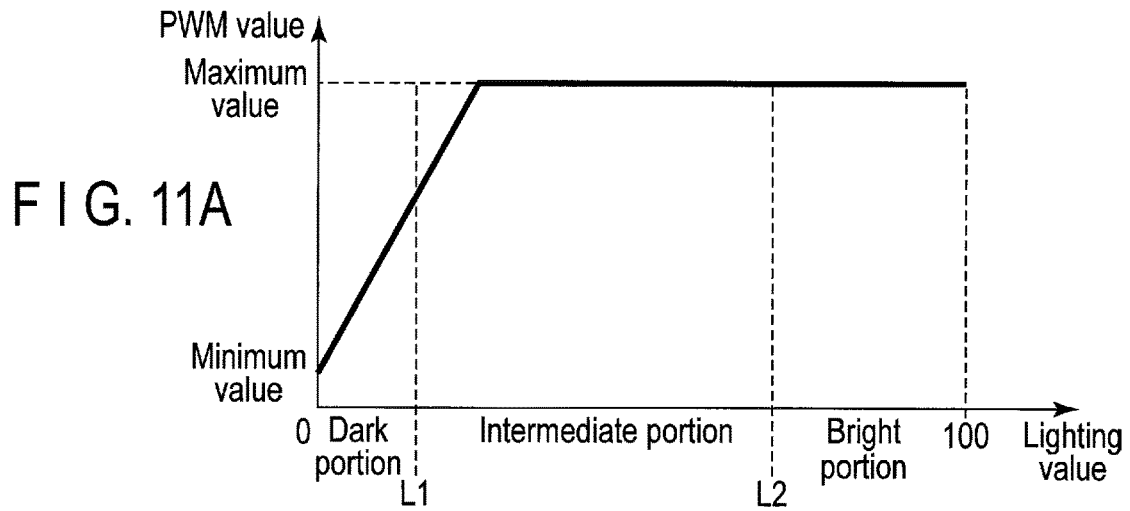
FIGS. 11A, 11B and 11C show an example of operation of the light source driving circuit 24 according to the fourth comparison example.
Figure 11B:
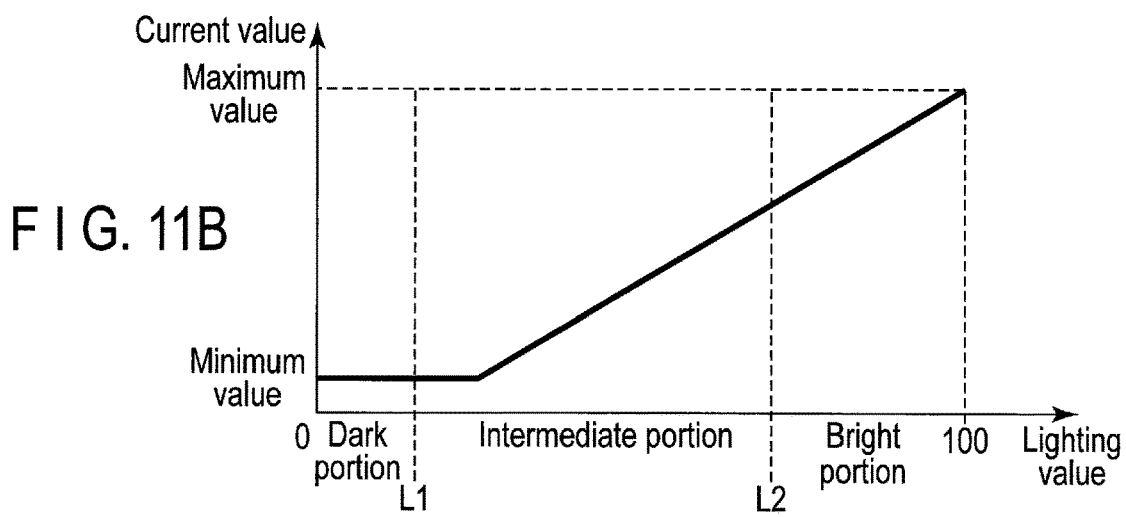
Figure 11C:
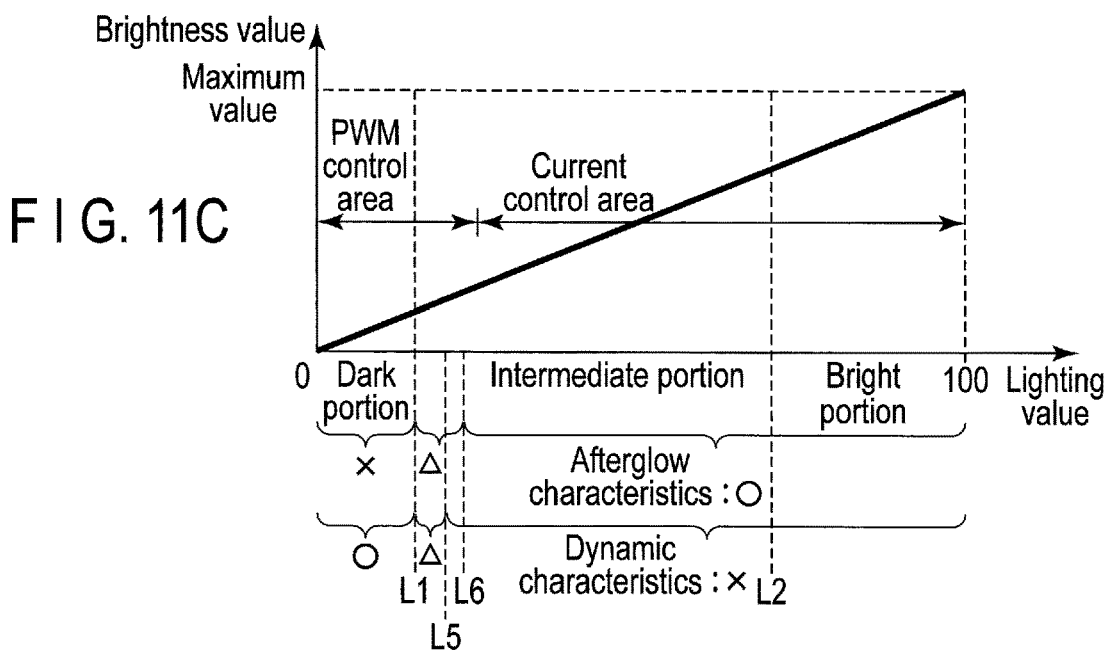

This specification explains the fourth comparison example with reference to FIGS. 11A, 11B, and 11C. In the fourth comparison example, the PWM control of the lighting time is performed in a state where the current value is fixed to the minimum value when the lighting value is less than a certain value, and the current control is performed in a state where the PWM value is fixed to the maximum value when the lighting value is greater than or equal to the certain value. FIG. 11A is a graph showing the change in the PWM value for the lighting value. FIG. 11B is a graph showing the change in the current value for the lighting value. FIG. 11C is a graph showing the change in the brightness value of the liquid crystal display panel of the display device 18 for the lighting value. The brightness value is controlled so as to linearly change for the lighting value. The definitions of the dark portion, intermediate portion and bright portion are the same as those explained with reference to FIGS. 3A, 3B, and 3C.

Regarding an area in which the lighting value is less than a certain value (which is between the first threshold L1 and the second threshold L2 and closer to the first threshold L1 than the second threshold L2), the PWM control is performed such that the PWM value of the lighting time changes from the minimum value to the maximum value in accordance with the lighting value as shown in FIG. 11A in a state where the current value is fixed to the minimum value as shown in FIG. 11B. Regarding an area in which the lighting value is greater than or equal to the certain value, the current control is performed such that the current value changes from the minimum value to the maximum value in accordance with the lighting value as shown in FIG. 11B in a state where the PWM value is fixed to the maximum value as shown in FIG. 11A. In this manner, the brightness value of the display device 18 linearly changes for the lighting value as shown in FIG. 11C.

In this drive control of LED according to the fourth comparison example, the PWM value is less in the area of the dark portion. Thus, although hold blur is less, and the dynamic characteristics are good, the effect of an after glow of red phosphorescence is noticeable in the area of the dark portion. The PWM value increases with increasing lighting value. Thus, an afterglow of red phosphorescence is less noticeable as the lighting value is increased. When the lighting value is less than or equal to L1, an afterglow of red phosphorescence is noticeable. However, when the lighting value exceeds L1, an afterglow of red phosphorescence is less noticeable. When the lighting value exceeds L6, an afterglow of red phosphorescence is hardly recognized. Hold blur increases with increasing the PWM value. Thus, the dynamic characteristics are degraded as the PWM value increases. When the lighting value is less than or equal to L1, the dynamic characteristics are good. However, when the lighting value exceeds L1, the dynamic characteristics are degraded. When the lighting value exceeds L5, the dynamic characteristics are significantly degraded. When the LED is driven as shown in FIG. 11A and FIG. 11B, in the intermediate portion in which the change of the lighting value is the largest, the dynamic characteristics are degraded while an afterglow of red phosphorescence is less noticeable.

Figure 12A:
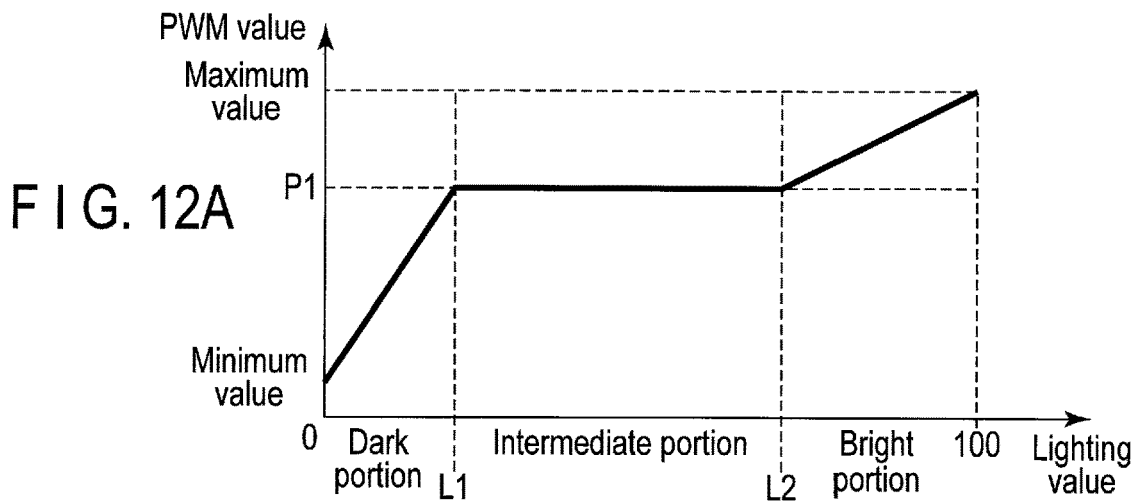
FIGS. 12A, 12B and 12C show an example of operation of the light source driving circuit 24 according to the embodiment.
Figure 12B:
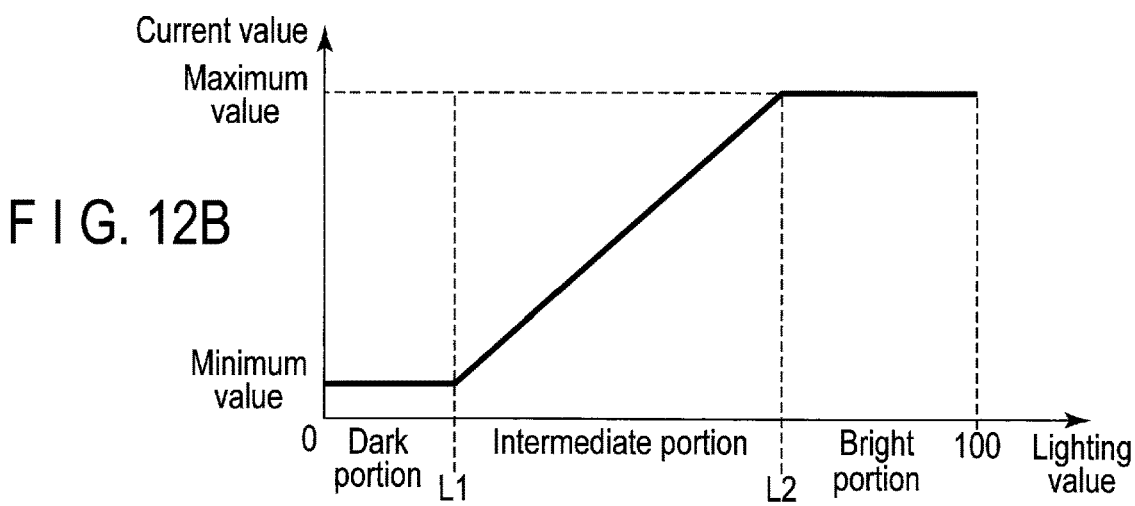
Figure 12C:
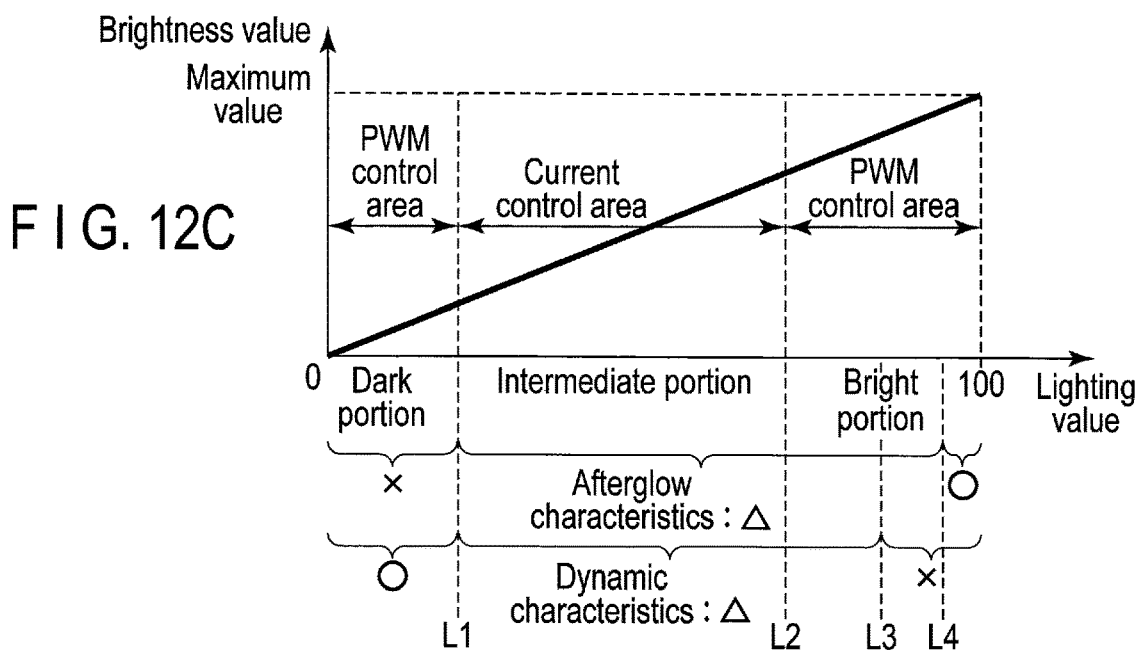

In the present embodiment, the current value/PWM value calculation circuit 22 drives the LED as shown in FIG. 3A and FIG. 3B. This specification explains the dynamic characteristics and red phosphorescence afterglow of the embodiment with reference to FIGS. 12A, 12B, and 12C. FIGS. 12A, 12B, and 12C show the PWM value, the current value and the brightness value for the lighting value in a manner similar to those of FIGS. 3Am 3B, and 3C. Regarding an area in which the lighting value belongs to the dark portion, the PWM control is performed such that the PWM value of the lighting time changes from the minimum value to P1 in accordance with the lighting value as shown in FIG. 12A in a state where the current value is fixed to the minimum value as shown in FIG. 12B. Regarding an area in which the lighting value belongs to the intermediate portion, the current control is performed such that the current value changes from the minimum value to the maximum value in accordance with the lighting value as shown in FIG. 12B in a state where the PWM value is fixed to P1 as shown in FIG. 12A. Regarding an area in which the lighting value belongs to the bright portion, the PWM control is performed such that the PWM value of the lighting time changes from P1 to the maximum value in accordance with the lighting value as shown in FIG. 12A in a state where the current value is fixed to the maximum value as shown in FIG. 12B.

In this drive control of LED according to the present embodiment, the PWM value is less in the area of the dark portion. Thus, although hold blur is less, and the dynamic characteristics are good, an afterglow of red phosphorescence is noticeable. The PWM value increases with increasing lighting value. Thus, an afterglow of red phosphorescence is less noticeable as the lighting value is increased. When the lighting value is less than or equal to L1, an afterglow of red phosphorescence is noticeable. However, when the lighting value exceeds L1, an afterglow of red phosphorescence is less noticeable. When the lighting value exceeds L4, an afterglow of red phosphorescence is hardly recognized. Hold blur increases with increasing the PWM value. Thus, the dynamic characteristics are degraded as the PWM value increases. When the lighting value is less than or equal to L1, the dynamic characteristics are good. However, when the lighting value exceeds L1, the dynamic characteristics are degraded. When the lighting value exceeds L3, the dynamic characteristics are significantly degraded. For this reason, in the area of the intermediate portion in which the change of the lighting value is the largest, an afterglow of red phosphorescence is less noticeable, and the dynamic characteristics are not significantly degraded.

According to the embodiment, the liquid crystal display device uses the LED backlight emitting phosphorescence having a long transient response of several tens of milliseconds and area control is applied to the backlight. In the variable range of the current value and the PWM value set in consideration of power, etc., the PWM control of the lighting time is performed in the area of the dark portion having a less lighting value in a state where the current is fixed to the minimum value. The PWM control of the lighting time is performed in the area of the bright portion having a great lighting value in a state where the current is fixed to the maximum value. The current control is performed in the other area of the intermediate portion in a state where the PWM value is kept constant. The change in the lighting value is the largest in the area of the intermediate portion. In this way, in the area of the intermediate portion, it is possible to maintain as good dynamic characteristics as possible while preventing the effect of the afterglow of red phosphorescence.

The specific values of the embodiment, for example, the thresholds L1 and L2 of the lighting value for determining the boundaries of the dark portion, intermediate portion and bright portion, and the PWM value P1 indicating that no effect is caused by an afterglow of red phosphorescence, are merely examples. The values are not limited to the above disclosure. The specific examples of the light sources which emit phosphorescence are not limited to the white LEDs 38, 40 and 42 shown in FIG. 5. The backlight source is not limited to the direct-type light source device shown in FIG. 4, and may be of a type in which light sources are provided at the edges of the four sides of the display panel 31.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display comprising a screen, the display configured to display an image based at least in part on a video signal; and
a light source comprising:
light-emitting elements configured to emit phosphorescence, the light-emitting elements disposed corresponding to areas included in the screen;
a circuit configured to calculate a lighting value of the light-emitting elements for each of the areas based at least in part on the video signal, and determine, to which of a first range, a second range or a third range the lighting value belongs; and
a driver configured to:
supply, to the first light-emitting element in the first area, the first drive pulse comprising the amplitude set to a minimum amplitude and the pulse width ranging from a minimum pulse width to a first pulse width;
supply, to the second light-emitting element in the second area, the second drive pulse comprising the amplitude the amplitude ranging from the minimum amplitude to a maximum amplitude and the pulse width set to the first pulse width; and
supply, to the third light-emitting element in the third area, the first drive pulse comprising the amplitude set to the maximum amplitude and the pulse width ranging from the first pulse width to a maximum pulse width.

2. The display device of claim 1, wherein the afterglow of phosphorescence does not occur on the screen when the pulse width of the first drive pulse or the second drive pulse is greater than the first pulse width.

3. A display device comprising:
a display comprising a screen, the display configured to display an image based at least in part on a video signal; and
a light source comprising:
light-emitting elements configured to emit phosphorescence, the light-emitting elements disposed corresponding to areas included in the screen;
a circuit configured to calculate a lighting value of the light-emitting elements for each of the areas based at least in part on the video signal, and determine, to which of a first range, a second range or a third range the lighting value belongs; and
a driver configured to supply, to the light-emitting elements, a first drive pulse comprising a constant amplitude and a pulse width based at least in part on the lighting value or a second drive pulse comprising an amplitude based at least in part on the lighting value and a constant pulse width, based at least in part on determination of a range of the lighting value,
wherein an afterglow occurs on a first area of the screen, wherein the first area comprises a first light-emitting element that has the lighting value in the first range, the afterglow of the screen is weaker as the lighting value is greater, hold blur does not occur on the first area of the screen, and the hold blur is stronger as the lighting value is greater.

4. The display device of claim 3, wherein both the afterglow and the hold blur on a second area of the screen are optimized, wherein the second area comprises a second light-emitting element that has the lighting value in the first range.

5. A liquid crystal display comprising:
a screen;
a first light source and a second light source configured to emit phosphorescence to lighting the screen;
a first driver configured to generate and supply a first drive pulse to the first light source, the first driver pulse generated based at least in part on a first lighting value of the first light source, wherein the first lighting value belongs to a first lighting range, the first drive pulse comprising a constant amplitude and a pulse width based at least in part on the first lighting value; and
a second driver configured to generate and supply a second drive pulse to the second light source, the second driver pulse generated based at least in part on a second lighting value of the second light source, wherein the second lighting value belongs to a second lighting range, second drive pulse comprising a constant pulse width and an amplitude based at least in part on the second lighting value.

* * * * *